(12) United States Patent
McGraw

(10) Patent No.: US 11,121,922 B2
(45) Date of Patent: Sep. 14, 2021

(54) AUTOMATIC NETWORK ASSEMBLY

(71) Applicant: Hewlett Packard Enterprise Development LP, Houston, TX (US)

(72) Inventor: Montgomery C. McGraw, Magnolia, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 198 days.

(21) Appl. No.: 15/723,012

(22) Filed: Oct. 2, 2017

(65) Prior Publication Data

US 2019/0104021 A1   Apr. 4, 2019

(51) Int. Cl.
*H04L 12/24* (2006.01)
*H04L 12/933* (2013.01)

(52) U.S. Cl.
CPC ...... *H04L 41/0886* (2013.01); *H04L 41/0806* (2013.01); *H04L 49/1523* (2013.01)

(58) Field of Classification Search
None
See application file for complete search history.

(56) References Cited

U.S. PATENT DOCUMENTS

| | | | |
|---|---|---|---|
| 7,689,701 B2 | 3/2010 | de Kerf | |
| 8,527,622 B2 | 9/2013 | Moreira Sa de Souza | |
| 8,826,138 B1 | 9/2014 | Denardo et al. | |
| 9,294,347 B2 | 3/2016 | Shetty et al. | |
| 2014/0052843 A1* | 2/2014 | Goyal | H04L 49/70 709/224 |
| 2014/0059265 A1 | 2/2014 | Iyer et al. | |
| 2015/0163100 A1* | 6/2015 | Graf | H04L 43/12 370/255 |
| 2015/0212902 A1 | 7/2015 | Horspool | |
| 2016/0294650 A1 | 10/2016 | Padhye et al. | |
| 2018/0013630 A1* | 1/2018 | Tatlicioglu | H04L 41/12 |

FOREIGN PATENT DOCUMENTS

| | | |
|---|---|---|
| CN | 104092605 A | 10/2014 |
| CN | 106411574 A | 2/2017 |
| EP | 1753174 A1 | 2/2007 |
| WO | WO-2016167808 A1 | 10/2016 |

OTHER PUBLICATIONS

HPE Synergy: The first platform architected for composability to bridge traditional and cloud native apps. Hewlett Packard Enterprises. Feb. 2016. (Year: 2016).*

(Continued)

*Primary Examiner* — Scott B Christensen
(74) *Attorney, Agent, or Firm* — Hewlett Packard Enterprise Patent Department

(57) ABSTRACT

Some examples provide a method for automatic network assembly. The following instructions may be used to implement automatic network assembly in a modular infrastructure. Instructions to automatically connect a management port to a management network. Instructions to automatically connect link ports to form a scalable ring. Instructions to automatically connect each modular infrastructure management device to a bay management network port.

20 Claims, 4 Drawing Sheets

(56) References Cited

OTHER PUBLICATIONS

QuickSpecs HPE Synergy 10Gb Interconnect Link Module. Hewlett Packard Enterprises. Jul. 2016. (Year: 2016).*
Quckspecs HPE Synergy 12000 Frame. Hewlett Packard Enterprises. Sep. 2016. (Year: 2016).*
Quckspecs HPE Synergy 40Gb F8 Switch Module. Jul. 2016. (Year: 2016).*
QuickSpecs HPE Synergy Composer. Hewlett Packard Enterprises. Mar. 2016. (Year: 2016).*
QuickSpecs HPE Synergy Image Streamer. Hewlett Packard Enterprises. Mar. 2016. (Year: 2016).*
"Managing Hewlett Packard Enterprise Servers Using the RESTful API", published Aug. 2016 (Year: 2016).*
HPE, "HP Integrated Lights-Out security, Technology brief, 7th Edition", available online at https://support.hpe.com/hpsc/doc/public/display?docId=emr_na-c00212796&lang=en-us&cc=us, Dec. 2010, 32 pages.
Grimm et al., "Current Threat Model diagram" in Update from the Supply Chain Technical Working Group, Sep. 11, 2013, 21 pages.
David Cooper et al., "BIOS Protection Guidelines NIST-SP800-147", Recommendations of the National Institute of Standards and Technology, Apr. 2011, 26 pages.
"Security Reference Manual for i.MX 6Dual, 6Quad, 6Solo, and 6DualLite Families of Applications Processors", Rev 0, Section 5.8, Match 2013, 648 pages.
Hewlett Packard Enterprise, Hewlett Packard Enterprise Introduces New Class of System to Power Next Era in Hybrid Infrastructure, News Release, 4 Pgs.
IBN Storwize Family Storage Systems with SAS Workloads on IBM Power Systems Servers, (Research Paper), IBM Systems and Technology Group ISV Enablement, Mar. 2013, 48 Pgs.

\* cited by examiner

AUTOMATIC NETWORK ASSEMBLY

BACKGROUND

Converged infrastructure includes servers, storage, networking, and integrated software and services. These systems are designed to address the cost and complexity of data center operations and maintenance by pulling the IT components together into a single resource pool so they are easier to manage and faster to deploy.

DRAWINGS

DETAILED DESCRIPTION

Figure 1:
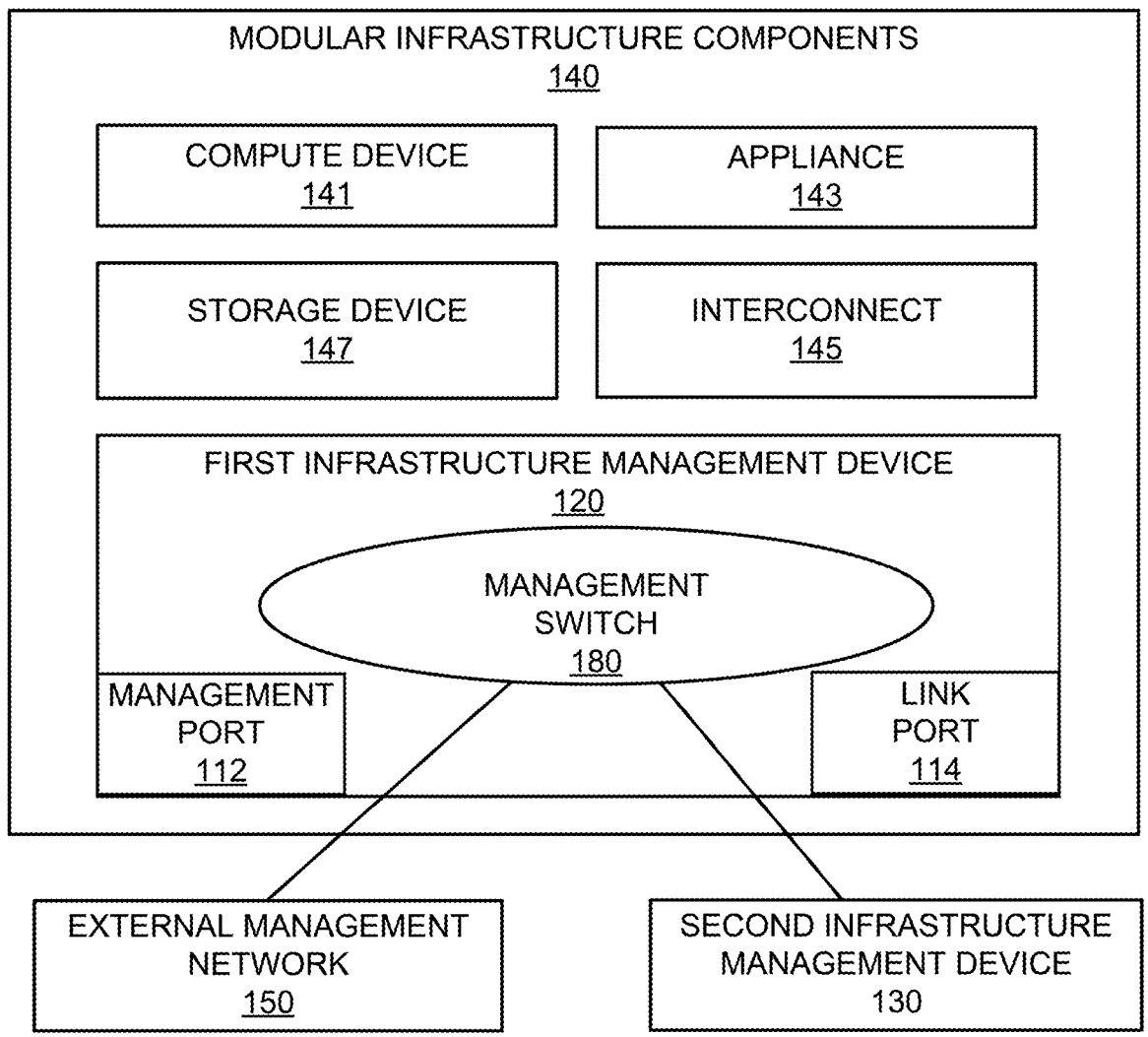
FIG. 1 illustrates an overview of a system for automatic network assembly infrastructure management devices according to an example.

Converged infrastructure systems provide a single resource pool for IT components together into a solution that is easier to manage and faster to deploy. As part of the solution, the management network fabric provides for the connectivity of the infrastructure allowing the overall solution to be managed. A key challenge in setting up and administering converged infrastructure is that the infrastructure cannot be managed before the management network fabric itself is assembled and fully functional. Manually setting up a network fabric is time consuming and error prone as this requires much information regarding all the connected infrastructure elements, how they are connected, and configuration of network protocols and network security. All of this information must be accurately programmed into the infrastructure components before use. Discovery, assembly, and full functionality of a converged infrastructure network fabric in an automated manner is provided herein.

Converged infrastructure hardware must be physically setup based on design requirements and desired capacities. For example, a set of servers and storage within a set of racks must all be connected with power and network connectivity for some desired topology. The desired typologies are based on the customer workloads to be run on top of the infrastructure and can include preferences for performance and/or high availability. After the infrastructure has been installed and cabled, software configurations must be applied to the network fabric and infrastructure within. Existing computer systems with heterogeneous or homogeneous enclosures containing servers, networking, storage, and/or system management require extensive manual configuration of IP addresses, and login credentials for every node before management network communications is operational. In addition the switches that connect all the enclosures must all be configured prior to any production network communications between any of the nodes in the system. These manual configuration prerequisites may require setup by different people based on roles and responsibilities for administration of servers versus storage or networking equipment.

For example, manual processes are difficult, tedious and error prone. Many of the setup and configuration steps require manual intervention and deep knowledge about the network fabric specifics, especially when errors or anomalies exist. This is both time consuming and error prone. Some automation tools exist but these are not well integrated into the overall solution. Additionally, manual processes often result in incorrect setup of hardware. A management network fabric is physically setup to connect servers, storage and up-links into the customer's data center. The resultant manual setup is complex and error prone. In these cases, customers are confronted with complex physical network fabric changes which may require help from the network vendor or a network administrator with deep knowledge. This results in down time and unrealized infrastructure. The network device, system, and methods herein can pin-point anomalies and errors automatically and suggest appropriate corrective action.

The infrastructure management device, system, and machine-readable storage medium herein automate these steps through automatic network assembly, which dramatically reduces the setup time for a single or multiple enclosure computer system by eliminating the requirement of configuring individual network addresses for each node and configuring network switches to create the system communication between all nodes and enclosures. No network IP address configuration is required on any node except configuring one routable IP address for remote access to an infrastructure management appliance. The automatic network assembly using infrastructure management devices can also provide automatic fault tolerant connectivity to all the nodes and all the enclosures, which protects the computer system against failure of a switch or failure of a network cable.

Examples of a method for automatic network assembly is provided herein. The method includes instructions to implement automatic network assembly in a modular infrastructure. Instructions to automatically connect a management port to a management network. Instructions to automatically connect link ports to form a scalable ring. Instructions to automatically connect each modular infrastructure management device to a bay management network port.

FIG. 1 illustrates an overview of a system for automatic network assembly infrastructure management devices according to an example. System 100 may be implemented in a number of different configurations without departing from the scope of the disclosed examples. In FIG. 1, system 100 includes a first infrastructure management device 120, a set of modular infrastructure components 140, a management network 150, and a management switch 180 for connecting first infrastructure management device 120 with modular infrastructure components 140, management network 150, and/or a second infrastructure management device 130.

For example, modular infrastructure components 140 may include an infrastructure management device 120, a compute device 141, an interconnect 145, an appliance 143, and a storage device 147. Components 140 are connected through a management switch 180 on an infrastructure management device 120, in addition to component 140 out-of-band connections to every bay using redundant controller area network busses. Bay presence signals are detected and bay information is retrieved from controller area network microcontrollers for all bays. This bay information indicates to infrastructure management devices 120, 130 the protocol used to manage that bay. Interconnects 145 and storage devices 147 may use out-of-band messages to communicate management network parameters such as IP address or credentials. Compute devices 141 may be discovered over the management network 150 using Simple Service Discovery Protocol (SSDP). Appliances 143 may be discovered over the management network 150 using Link Layer Discovery Protocol (LLDP). If the component credentials are also learned during the discovery, and if all components on the management network 150 use IPv6 link local IP addresses, the first infrastructure management device 120 can automatically use higher level network protocols like TCP/IP to establish management network communications with every modular infrastructure component in the modular infrastructure connected to management switch 180 without any need for manual setup.

Management network 150 provides connectivity to modular infrastructure components 140 from outside or external.

The arrangement illustrated in FIG. 1 is simply an example, and system 100 may be implemented in a number of different configurations. For example, while FIG. 1, shows one set of modular infrastructure components 140, connected to management network 150 and optionally to another or second infrastructure management device 130. System 100 may include any number of components 141, 143, 145, 147, and 120, as well as other components not depicted in FIG. 1. System 100 may also omit any of components 141, 143, 145 or 147.

Figure 2:
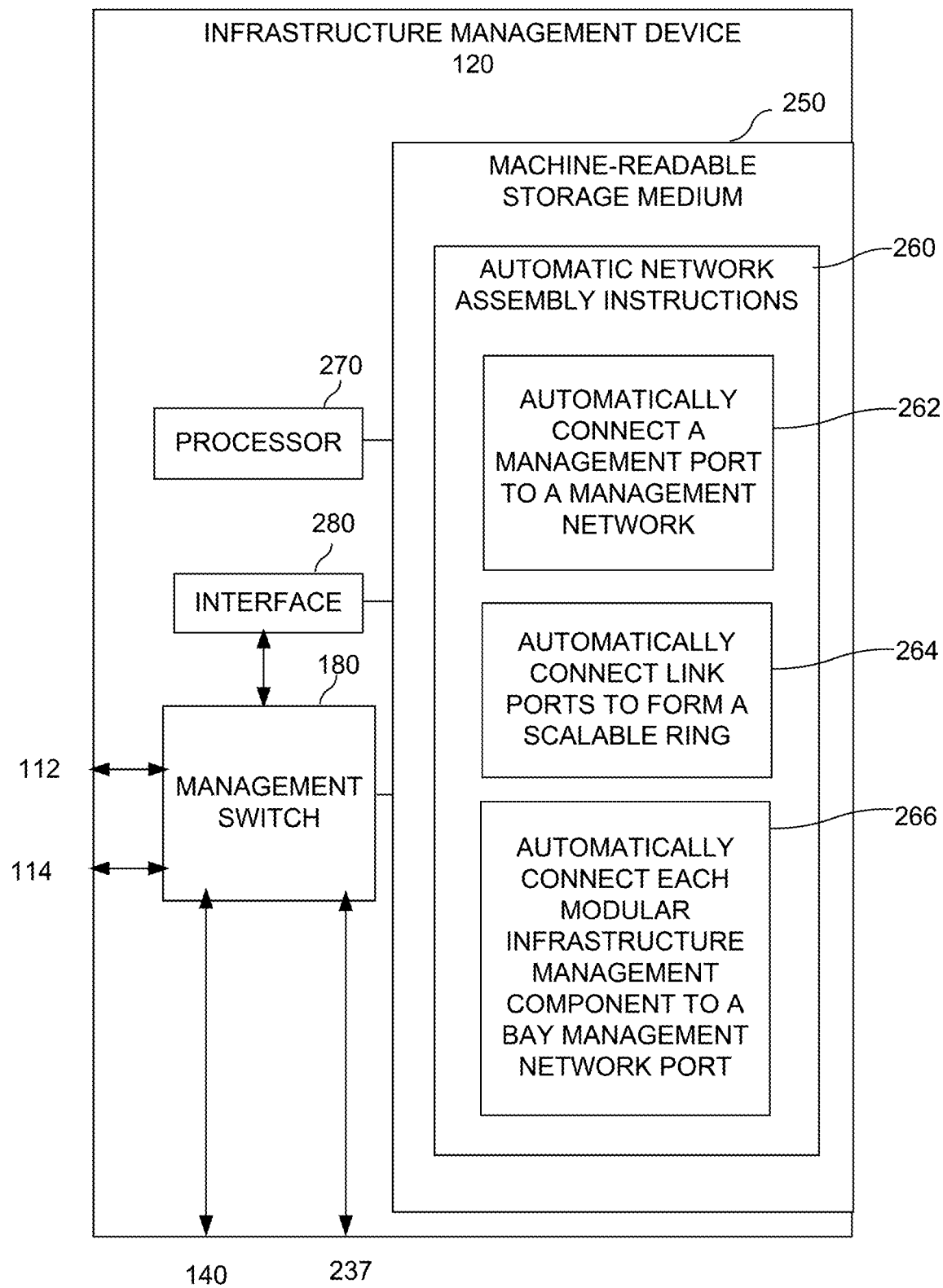
FIGS. 2-3 illustrate infrastructure management devices to perform automatic network assembly according to examples.
Figure 3:
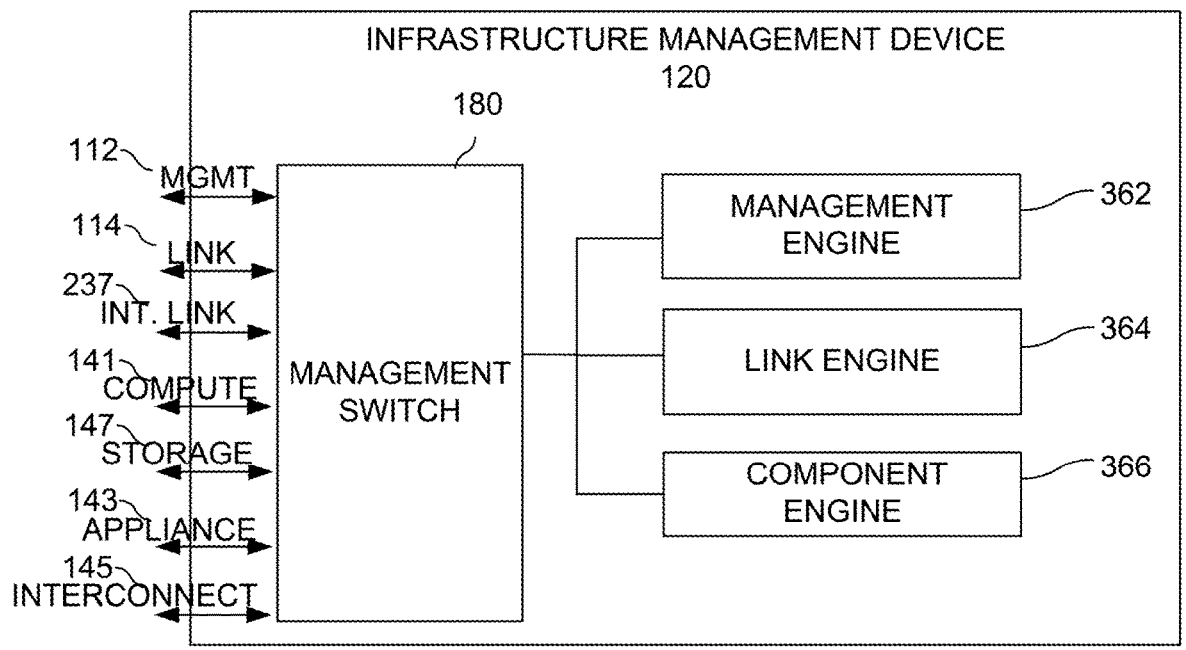

FIGS. 2-3 illustrate infrastructure management device components to perform automatic network assembly according to examples. Referring to FIG. 2, infrastructure management device 120 is illustrated. In certain aspects, infrastructure management device 120 may correspond to multiple infrastructure management devices 120 of FIG. 1, such as a primary and redundant infrastructure management device illustrated in FIG. 4. Infrastructure management device 120 may be implemented in various ways. For example, infrastructure management device 120 may be a special purpose computer, a server, a mainframe computer, a computing device executing instructions that receive and process information and aggregates compute, storage, and fabric resources. In the example shown in FIG. 2, infrastructure management device 120 may include a machine-readable storage medium 250, a processor 270, a management switch 180, and an interface 280.

Processor 270 may be at least one processing unit (CPU), microprocessor, and/or another hardware device to execute instructions to perform operations. For example, processor 270 may fetch, decode, and execute automatic network assembly instructions 260 (e.g., instructions 262, 264, and/or 266) stored in machine-readable storage medium 250 to perform operations related to examples provided herein.

Interface 280 may be any device that facilitates the transfer of information between infrastructure management device 120 and other modular infrastructure components, such as compute devices 141, appliances 143, interconnects 145, and storage devices 148; management network 150. In some examples, interface 280 may include a network interface device that allows infrastructure management device 120 to receive and send data to and from network 180. For example, interface 280 may retrieve and process data related to automatic network assembly from via network 180.

Machine-readable storage medium 250 may be any electronic, magnetic, optical, or other physical storage device that stores executable instructions. Thus, machine-readable storage medium 250 may be, for example, memory, a storage drive, an optical disc, and/or the like. In some implementations, machine-readable storage medium 250 may be non-transitory, such as a non-transitory computer-readable storage medium, where the term "non-transitory" does not encompass transitory propagating signals. Machine-readable storage medium 250 may be encoded with instructions that, when executed by processor 270, perform operations consistent with the examples herein. For example, machine-readable storage medium 250 may include instructions that perform operations that automatically assemble networks with infrastructure management devices. In the example shown in FIG. 2, the machine-readable storage medium 250 may be a memory resource that stores instructions that when executed cause a processing resource, such as processor 270 to implement a system to perform automatic network assemble. The instructions include automatic network assembly instructions 260, such as instructions 262, 264, 266.

Instructions 262 may function to automatically connect a management port 112 to a management network. For example, when instructions 262 are executed by processor 270, instructions 262 may cause processor 270 of infrastructure management device 120, and/or another processor to connect a pair of management ports 112 to a management network. Instructions 262 may also function to connect a pair of management ports 112 connected to datacenter switch to a management ring and require connection for infrastructure management devices in same bay as an appliance. The management ports 112 have automatic active and standby roles to prevent network loops. The management ports 112 are controlled by the ring owner to prevent loops on datacenter switches. Loop prevention may be based on ITU G.8032 standard, with additional instructions for automatic ring owner selection. The ring enables high availability and tolerates single cable or infrastructure management device faults. Management ports 112 provide high availability of connection to datacenter switches and automatic uplink speeds of, for example, 10 Gb or 1 Gb.

Figure 4:
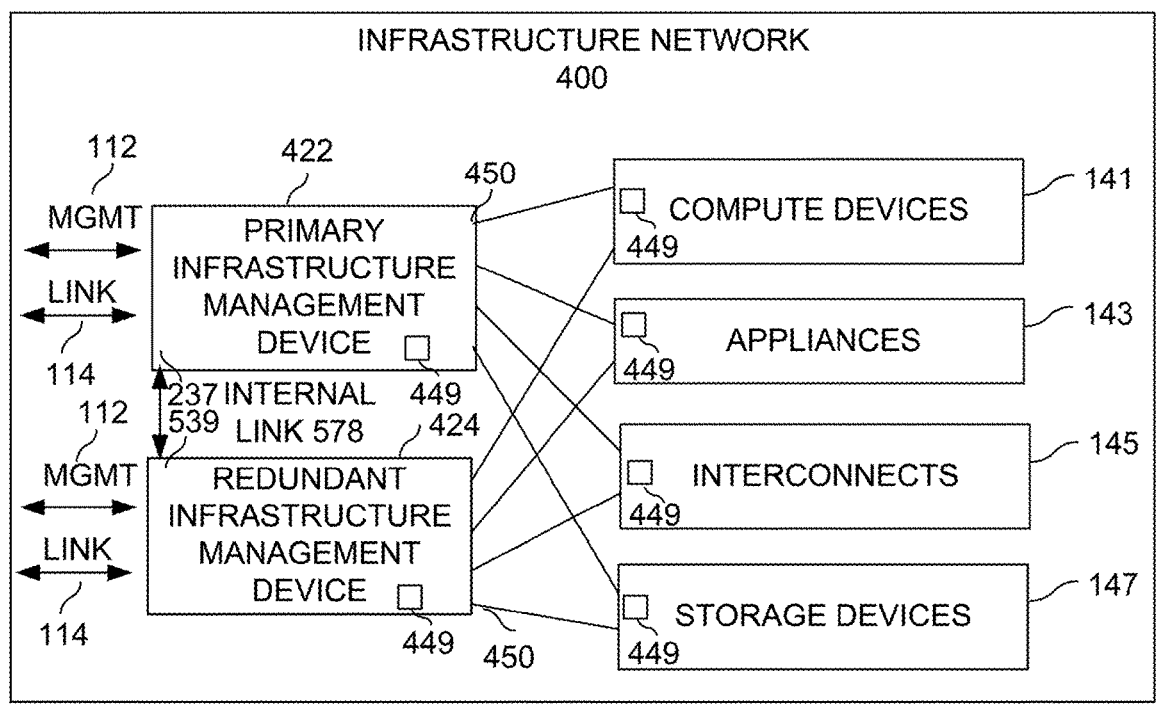
FIG. 4 illustrates an infrastructure network for automatic network assembly according to an example.
Figure 5:
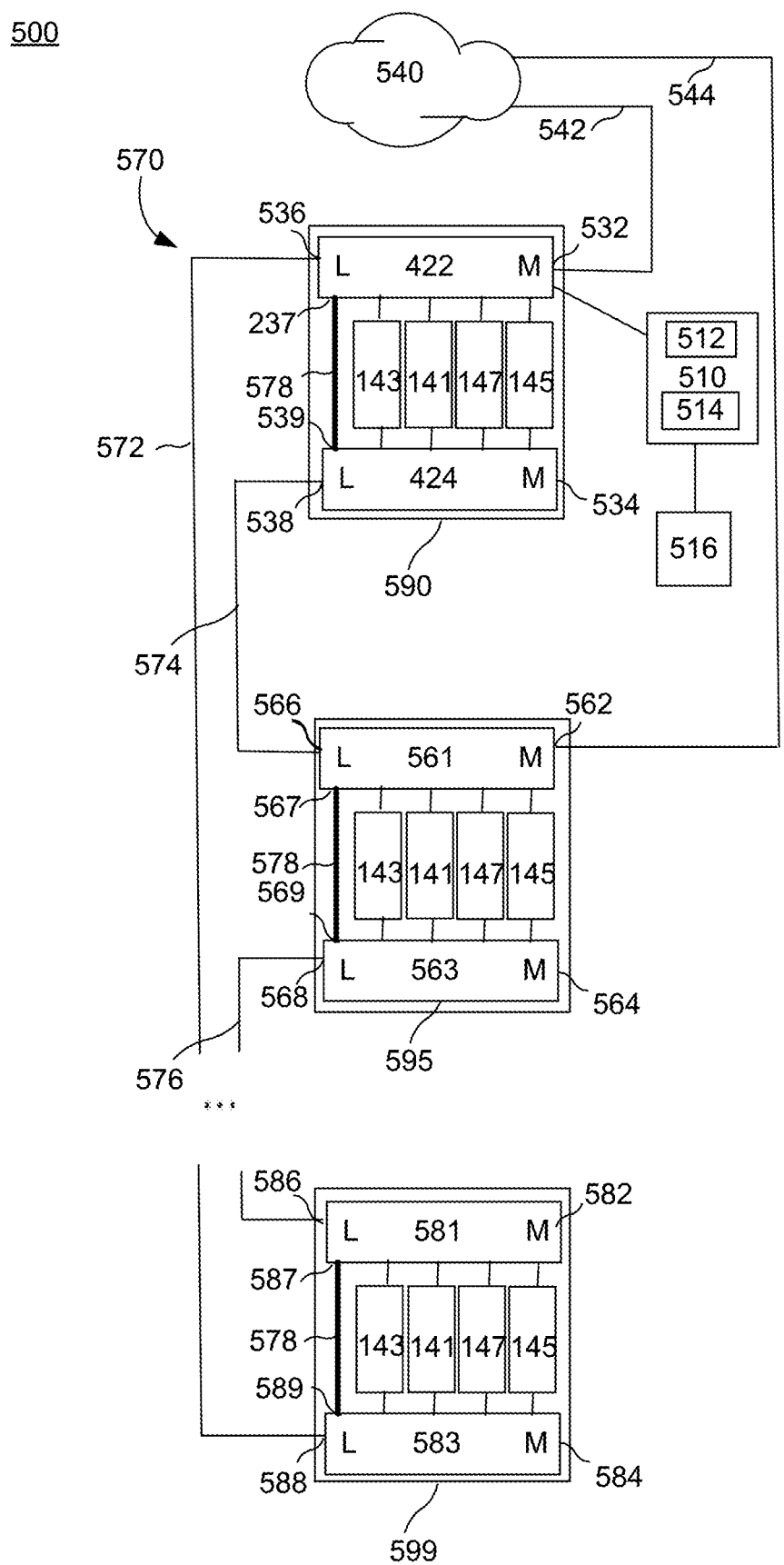
FIG. 5 illustrates a schematic view of infrastructure management devices connected to one another and a management network according to an example.

Instructions 264 may function to automatically connect link ports to form a scalable ring management network. For example, when instructions 264 are executed by processor 270, instructions 264 may cause processor 270 of infrastructure management device 120, and/or another processor to connect link ports 114, 237 to one another via an internal link on a midplane and an external link to form a scalable ring. Internal link ports 237 include an internal link to connect two infrastructure management devices in the same modular infrastructure via an internal link on a midplane. External link ports 114 include external links to connect to two separate infrastructure management devices and cannot be connected to datacenter switches but can only be connected to another link port. Additionally, external link ports 114 are disabled when a neighboring pair of link ports have different system owners. Additionally, the management network ring may automatically provision private VLANs for private communications between nodes within the ring. For example, the scalable ring may include an embedded, scalable 10 GB management network and use software to manage compute, storage, and fabric resources. Examples of the management ports 112, link ports 114, 237, and management software are illustrated in FIGS. 4-5.

Instructions 266 may automatically connect each modular infrastructure component 140 to a bay management network port. For example, when instructions 266 are executed by processor 270, instructions 266 may cause processor 270 of infrastructure management device 120, and/or another processor to connect each modular infrastructure component 140 to either a primary infrastructure management device 422 or a redundant infrastructure management device 424 via that device management switch 180 for automatic network connectivity and fault tolerance. Modular infrastructure components 140 communicate via a device protocol, such as a link level discovery protocol. Examples of the steps involved in providing automatic network assembly are described in further detail below with respect to, for example, FIGS. 4-5.

Referring to FIG. 3, infrastructure management device 120 is illustrated to include a management engine 362, a link engine 364, a component engine 366, and a management switch. In certain aspects, infrastructure management device 120 may correspond to infrastructure management device 120 of FIGS. 1-2. Infrastructure management device 120 may be implemented in various ways. For example, infrastructure management device 120 may be a computing system and/or any other suitable component or collection of components that provide automatic network assembly.

Management Switch 180 may be any device that facilitates the transfer of information between infrastructure management device 120 and internal or external components of the system 100. In some examples, management switch 180 may be located within infrastructure management device 120 to receive and send data to and from a network 140. For example, management switch 180 may retrieve and process data related to automatic network assembly.

Engines 362, 364, and 366 include hardware and/or combinations of hardware and programming to perform functions provided herein. Moreover, the modules (not shown) can include programming functions and/or combinations of programming functions to be executed by hardware as provided herein. For example, the instructions for the engines may be processor-executable instructions stored on a non-transitory machine-readable storage medium and the hardware for the engines may include a processor to execute those instructions. In some examples, the functionality of engines 362, 364, and 366 may correspond to operations performed by infrastructure management device 120 of FIGS. 1-2, such as operations performed when automatic network assembly instructions 260 are executed by processor 270. When discussing the engines and modules, it is noted that functionality attributed to an engine can also be attributed to the corresponding module and vice versa. Moreover, functionality attributed to a particular module and/or engine may also be implemented using another module and/or engine.

In FIG. 3, management engine 362 may represent a combination of hardware and instructions that perform operations similar to those performed when processor 270 executes instructions 262. Similarly, link engine 364 may represent a combination of hardware and instructions that perform operations similar to those performed when processor 270 executes instructions 264, and component engine 366 may represent a combination of hardware and instructions that perform operations similar to those performed when processor 270 executes instructions 266.

FIG. 4 illustrates an infrastructure network 400 for automatic network assembly for system 100 according to an example of a single modular infrastructure. FIG. 5 illustrates a schematic view 500 of system 100 comprised of multiple modular infrastructures with infrastructure management devices 120 connected to one another and a management network 540 according to an example. Referring to FIGS. 4-5, modular infrastructures, such as 590, 595, 599, include a set of modular infrastructure components 140, such as a set of compute devices 141, a set of interconnect modules 145, a set of storage devices 147, and a set of appliances 143, each network connected to the primary and redundant infrastructure management devices 422, 424 via the midplane 578 of modular infrastructures. The modular infrastructure components 140 may automatically discover one another using a protocol, such as a Link Layer Discovery Protocol (LLDP) or out-of-band protocol. Infrastructure management devices 422, 424 may automatically discover compute modules or other devices over the management network using a Simple Service Discovery Protocol (SSDP).

Modular infrastructures also includes a pair of infrastructure management devices 422, 424 that connect one or more external management ports 2112 to a management network and connect a set of link ports 114 to one another (e.g., pair of internal link ports 237 to one another via the midplane 578, and external link port 114 of the pair of link ports to an external link port 114 on another modular infrastructure 120) to form a scalable ring. Loop prevention is provided with automatic ring owner election on the scalable ring formed by connecting multiple modular infrastructure external link ports 114 in a ring. For example, loop prevention is provided using ITU G.8032 standard, with automatic selection of a ring owner that controls all the link ports on the management network ring to prevent a network loop. The ring of management network link ports provides a scalable management network backbone. The link ports can only be connected to other link ports, not to datacenter switch ports.

Infrastructure management device 422 communicates with infrastructure management device 432 within another modular infrastructure through the external link ports 114 using network information that includes a link level discovery protocol (LLDP) IPv6 local level cluster IP address and other modular infrastructure information. The link ports enable management network communication between modular infrastructures. Link cabling a new modular infrastructure into the ring results in either automatically adding it to the ring or blocking it from the ring based on its advertisement of association with the same system manager, no association, or a different system manager. If one of the external link ports 114 receives an LLDP message that advertises association with a different system manager, then that link port is disabled. In other words, ring communications are disabled between modular infrastructures when they advertise system managers.

Modular infrastructures may also include appliance 143 that uses system manager software to manage compute 141, storage 147, and fabric resources, such as interconnect 145 connected to the modular infrastructures via the management network. A set of controller area network microcontrollers 449 that are located in each component of the modular infrastructure. The infrastructure management device 120 detects bay presence signals and retrieves bay field replacement units from controller area network microcontrollers 449 for the set of bay management network ports connected to the management switch 180. In essence, the set of controller area network controllers 449 provide instructions to the infrastructure management device 120 for the network requirements of each of the modular infrastructure bays. The infrastructure management device 120 may construct a restful information services model based on controller area network microcontroller 449 message block information for some of the modular infrastructure components. The system 100 may use in band network protocols or out-of-band methods such as controller area network messages for management network discovery.

Referring to FIG. 5, a system 500 is illustrated to include infrastructure management devices 422, 424 with an external management port 112, an internal link port 237, an external link port 114, and a set of bay management network ports 450 connected to compute devices 141, storage devices 147, interconnects 145, and appliances 143. The external management port 532 to connect the infrastructure management device to a management network 540. The internal link port 237 to connect the infrastructure management device 120 to the internal link port 539 of the redundant infrastructure management device in the same modular infrastructure. Internal link ports 237/539, 568/569, and 587/589 are connected on a midplane 578. External link ports 536, 538, connect infrastructure management devices 422, 424 to another infrastructure management device (such as 561, 563, 582, or 583) via another external link port 566, 568, 586, 588 on another infrastructure management device (such as 561, 563, 582, or 583). Connections between all the external link ports 536, 538, 586, 588, and through all the internal link ports 237/539, 568/569, and 587/589 form a management network ring. Either management port 532 or 562 is active and connects all the nodes in system 500 to the management network 540, while the other port is standby and can be automatically enabled if a fault is detected on the active management port for automatic fault tolerance. Management ports 534, 564, 582, 584 are not connected to management network 540 in this example.

FIGS. 4-5 illustrate configurations useable with automatic assembly in infrastructure management devices, such as 120, 130, 422, 424, 561, 563, 581, and 583. Automatic assembly enables connectivity in a single or multiple enclosure computer system to be instantiated without any user configuration by simply network cabling the enclosures together. Computer systems can be comprised of heterogeneous or homogeneous enclosures containing servers, networking, storage, and/or system management nodes. Automatic network assembly of a homogeneous or heterogeneous set of enclosures comprising a computer system requires network switches designed to provide communications between all nodes without user settings. Network switches may also automatically allow increasing or decreasing the size of the computer system by simply cabling in new enclosures to the network switches. Network switches may also provide automatic fault tolerance at an enclosure level, where a single network switch failure or single network cable failure is automatically detected and network communication is rerouted around the fault without impacting any node communication. Network switches may also provide fault tolerant communication paths to every node, so that single network switch failure is automatically detected and network communication is rerouted around the fault without impacting communication to any node The size of modular system 500 is determined by all frames that are linked together. For example, modular system 500 is scalable up to 21 frames, which means the modular system 500 can handle hundreds of compute and storage modules and manage scalable multi-frame fabrics. Modular system 500 also includes high availability and embedded management. Automatic assembly works once frames are linked in a ring, with for example CAT6 cable and connected to a 10 Gb management backbone fabric. Two appliances 143 manage dozens of frames, two infrastructure management devices 422, 424, 561, 563, 581, 583 protect each frame, and a front panel 510 has a keyboard, video, mouse (KVM) 512 and laptop port 514 connected to an infrastructure management device 422 to provide an infrastructure management console 516. For example, an installer plugs into the front panel console in frame with an appliance, clicks "Connect to Management Software", and then clicks "Hardware Setup." Active infrastructure management device which control front panels connects to appliance system manager URL. Appliance 143 takes the active role and begins automatic discovery using the LLDP from the infrastructure management device 120 and claims the infrastructure management device. Appliance 143 then traverses the infrastructure management device 422 restful data model to discover all the bays and claim them (frame 590), plus adjacent frames 595, 599 and repeats this process following the external links around the management ring until back to the original frame 590.

The disclosed examples may include systems, devices, computer-readable storage media, and methods for generating a natural language programming tool. For purposes of explanation, certain examples are described with reference to the components illustrated in FIGS. 1-5. The functionality of the illustrated components may overlap and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-5 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

What is claimed is:
1. A system comprising:
a first modular infrastructure including:
a plurality of infrastructure components, each including a set of controller area network microcontrollers;
a midplane;
a plurality of infrastructure management devices coupled to the plurality of infrastructure components including a first infrastructure management device including: one or more external management ports;
one or more internal link ports;
one or more external link ports;
a machine readable storage medium having instructions for facilitating automatic assembly of a network without any user configuration beyond simple network cabling, wherein the facilitating allows the increasing and decreasing of the size of the system via the simple network cabling; and
a processor to execute the instructions, the instructions causing the processor to:
automatically connect:
the one or more external management ports to a management network,
the one or more internal link ports at each of the two or more infrastructure management device via a midplane, and
the one or more external link ports to one or more external link ports at a second infrastructure man- agement device within a second modular infrastructure via a discovery protocol to form a scalable ring,
wherein devices are automatically and selectively added or blocked from the ring based on advertised associations with a system manager; and
retrieve information from the set of controller area network microcontrollers for a set of bay management network ports,
wherein the processor performs the automatically connecting with automatic selection of a ring owner that controls the link ports on the management network to prevent network loops.

2. The system of claim 1, wherein the set of modular infrastructure components further comprise a set of compute devices, a set of interconnect modules, and a set of storage devices each network connected to an infrastructure management device via the midplane.

3. The system of claim 1, wherein the set of controller area network microcontrollers provide instructions for network requirements of modular infrastructure bays.

4. The system of claim 1, wherein the infrastructure management device constructs a restful information services model based on controller area network microcontroller message information.

5. The system of claim 1, wherein the infrastructure management device communicates with compute modules over a management network using a Simple Service Discovery Protocol (SSDP).

6. The system of claim 1, where the modular infrastructure components communicate to one another using a Link Layer Discovery Protocol (LLDP).

7. The system of claim 6, wherein the discovery protocols use an IPv6 link local address.

8. The system of claim 1, wherein the first modular infrastructure comprises a first frame and the second modular infrastructure comprises a second frame.

9. The system of claim 1, wherein the infrastructure management device communicates with the infrastructure management device within another modular infrastructure through the external link ports using network information that includes a link level discovery protocol (LLDP) IPv6 local level cluster IP address and an advertised cluster password.

10. The system of claim 1, wherein a connection between one of the external link ports and an external link port in another modular infrastructure is disabled when that link port advertise association with a different appliance.

11. The system of claim 1, wherein loop prevention is provided with automatic ring owner selection on the scalable ring formed by connecting multiple modular infrastructure external link ports in a ring.

12. An infrastructure management device comprising:
an external management port;
an external link port;
an internal link port;
a machine readable storage medium having instructions; and
a processor to execute the instructions to facilitate automatic assembly of a network without any user configuration beyond simple network cabling, wherein the facilitating allows the increasing and decreasing of the size of the system via the simple network cabling to automatically connect:
the infrastructure management device to a management network via the external management port, the infrastructure management device to a second infrastructure management device via the external link port and an external link port at the second infrastructure management device using a discovery protocol and connect the infrastructure management device to a redundant infrastructure management device in the same modular infrastructure via the internal link port, and retrieve information from the set of controller area network microcontrollers for a set of bay management network ports, wherein devices are automatically and selectively added or blocked from the ring based on advertised associations with a system manager and the processor performs the automatically connecting with automatic selection of a ring owner that controls the link ports on the management network to prevent network loops.

13. The infrastructure management device of claim 12, wherein the internal link port is on a midplane.

14. The infrastructure management device of claim 12, wherein connections between the external link port and the internal link port form a scalable ring.

15. The infrastructure management device of claim 12, wherein set of bay management network ports connect at least one of the following modular infrastructure components: a compute device, an interconnect, or a storage device.

16. A non-transitory computer readable medium comprising instructions that when executed cause a processor to facilitate automatic assembly of a network without any user configuration beyond simple network cabling, wherein the facilitating allows the increasing and decreasing of the size of the system via the simple network cabling, the instructions to automatically connect:
one or more external management ports at one or more infrastructure management devices within a first modular infrastructure to a management network,
one or more internal link ports of the one or more infrastructure management devices via a midplane, and
one or more external link ports at each of the one or more infrastructure management devices to one or more external link ports at one or more infrastructure management devices within a second modular infrastructure via a discovery protocol, wherein devices are automatically and selectively added or blocked from the ring based on advertised associations with a system manager; and
retrieve bay information from a set of controller area network microcontrollers for a set of bay management network ports,
wherein the automatic connecting is performed with automatic selection of a ring owner that controls the link ports on the management network to prevent network loops.

17. The non-transitory computer readable medium of claim 16, wherein the discovery protocol comprises a Link Layer Discovery Protocol (LLDP).

18. The non-transitory computer readable medium of claim 17, wherein the discovery protocols use an IPv6 link local address.

19. The non-transitory computer readable medium of claim 16, wherein the modular infrastructure management devices are connected via redundant controller area network busses.

20. The non-transitory computer readable medium of claim 16, wherein the modular infrastructure management devices communicate via a device protocol.

* * * * *